United States Patent [19]

Fujiyama et al.

[11] Patent Number: 5,146,595
[45] Date of Patent: Sep. 8, 1992

[54] GROUPING DEVICE FOR FORMING INPUT SIGNALS INTO GROUPS

[75] Inventors: Hiroyuki Fujiyama, Hino; Kouichi Kuroiwa, Yokohama; Shinji Nishikawa; Hidetoshi Shimura, both of Kawasaki; Shinji Oyamada, Yokohama, all of Japan

[73] Assignees: Fujitsu Limited; Fujitsu Microcomputer System Limited, Kawasaki, Japan

[21] Appl. No.: 267,862

[22] Filed: Nov. 7, 1988

[30] Foreign Application Priority Data

Nov. 11, 1987 [JP] Japan .................. 62-285125

[51] Int. Cl.⁵ .................................. G06F 13/14
[52] U.S. Cl. .................. 395/725; 364/DIG. 2; 364/940; 364/941; 364/941.3
[58] Field of Search .................. 395/725; 364/200 MS File, 900 MS File

[56] References Cited

U.S. PATENT DOCUMENTS

| | | | |
|---|---|---|---|
| 3,665,415 | 5/1972 | Beard et al. | 364/200 |
| 3,676,861 | 7/1972 | Ruth | 364/200 |
| 3,825,902 | 7/1974 | Brown et al. | 364/200 |
| 3,905,025 | 9/1975 | Davis et al. | 364/200 |
| 3,964,054 | 6/1976 | Annunziata et al. | 364/200 |
| 4,275,458 | 6/1981 | Khera | 364/900 |
| 4,470,111 | 9/1984 | Jenkins et al. | 364/200 |
| 4,799,148 | 1/1989 | Nishioka | 364/200 |

FOREIGN PATENT DOCUMENTS 0251234  1/1988  European Pat. Off. .
2253422  8/1975  France .
57-41727  3/1982  Japan .

OTHER PUBLICATIONS

"8259A/8259A-2/8259A-8 Programmable Interrupt Controller", Microsystem Components Handbook, 1984, AFN-00221E, pp. (2-120)-(2-137); Intel.

Primary Examiner—Gareth D. Shaw
Assistant Examiner—Paul Kulik
Attorney, Agent, or Firm—Armstrong & Kubovcik

[57] ABSTRACT

A grouping device comprises a register table and a grouping unit the register table having m registers corresponding to m groups, each register including an n-bits data storing portion corresponding to the n input signals, for registering relationships between the n input signals and the m groups, the grouping unit receiving grouping signals output from the register table and the n input signals, for selecting one group from the m groups for each input signal and grouping each input signal into the selected group in accordance with the register table. Therefore, the register access time is shortened and the confirmation of the contents of the register by the CPU is made easier.

12 Claims, 7 Drawing Sheets

GROUPING DEVICE FOR FORMING INPUT SIGNALS INTO GROUPS

BACKGROUND OF THE INVENTION

1. Field of the Invention

The present invention relates to a grouping device for arranging input signals in groups, more particularly, to a grouping device disposed between a central processing unit (CPU) and a plurality of input-output units and grouping a plurality of interrupt requests output from the input-output units into a number of interrupt levels of the CPU.

2. Description of the Related Art

In the prior art, a grouping device for arranging input signals in groups is used, for example, as a interrupt controller disposed between a CPU and a plurality of input-output units, and groups a plurality of interrupt requests output from the input-output units into a number of interrupt levels of the CPU.

Generally, the total number of input-output units connected to the CPU is greater than the number of groups or channels of the CPU; for example, the total number of interrupt requests output from the input-output units is greater than the total number of interrupt levels of the CPU. Therefore, in a data processing system, the interrupt requests output from the input-output units must be formed into groups corresponding to the interrupt levels of the CPU on the basis of whether or not the same relationship, for example, they have the same processing speed, exists between each interrupt request and each interrupt level.

Note, the total number of input-output units is not constant and is subject to change. Therefore, the relationships used to group the interrupt requests into the interrupt levels are registered in an erasable type register table, and thus, when the interrupt requests are grouped into the interrupt levels, the interrupt requests are grouped by referring to the register table.

In the conventional grouping device, the register table comprises n registers corresponding to the total number n of interrupt requests or input-output units. In this case, each register comprises an m-bits data storing portion corresponding to the total number m of the interrupt levels of the CPU. As described above, the number n of input-output units is greater than the total number m of the interrupt levels of the CPU, and consequently, in the conventional grouping device, one register must be provided for each input-output unit, and thus the total number of the registers is high, the register access time is long, and confirmation by the CPU of the relationships stored in the register table is difficult.

SUMMARY OF THE INVENTION

An object of the present invention is to provide a grouping device for forming n input signals into m groups, in which the total number of registers is reduced, the access time to the registers is shortened, and the confirmation of the contents of the registers by the CPU is made easier.

According to the present invention, there is provided a grouping device for forming n input signals into m groups, which comprises a register table and a grouping means. The register table includes m registers corresponding to the m groups of input signals, and having relationships between the n input signals and the m groups registered therein. The each register includes an n-bits data storing portion corresponding to the n input signals. The grouping means receives grouping signals output from the registered table and the n input signals, whereby one group is selected from the m groups for each input signal and each input signal is formed into a selected group in accordance with the register table. In the present invention, the registers are provided as a total number of m groups, i.e., the total number of registers is smaller than that of the conventional device, and thus the access time to the registers is shortened and the confirmation of the contents of the registers by the CPU is made easier.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

For a better understanding of the preferred embodiments, the problems of the related art will be first explained.

Figure 1:
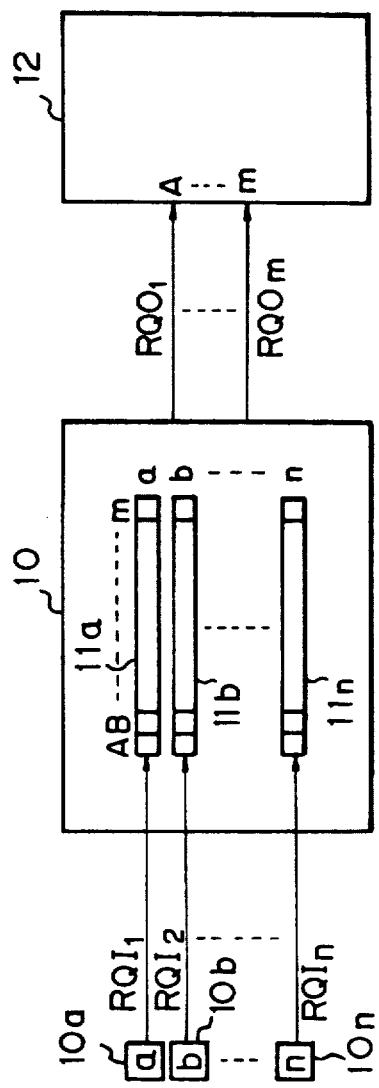
FIG. 1 is a block diagram of an example of a conventional grouping device.

FIG. 1 is a block diagram of one example of a conventional grouping device. The conventional grouping device for grouping input signals into groups is used, for example, as an interrupt controller disposed between a CPU 12 and a plurality of input-output units $10a$–$10n$, and forms a plurality of interrupt requests (interrupt request signals) $RQI_1$–$RQI_n$ output from the input-output units $10a$–$10n$ into a number of groups corresponding to a number of interrupt levels $RQO_1$–$RQO_m$ of the CPU 12, as shown in FIG. 1. Note, the interrupt levels $RQO_1$–$RQO_m$ indicate the priority values of the interrupt processes in the CPU 12.

In this conventional grouping device, for example, the interrupt controller, n registers $11a$–$11n$, the number of which is the same as the total number n of interrupt requests $RQI_1$–$RQI_n$ or input-output units $10a$–$10n$, are controlled by the interrupt controller 10. Each register $11a$–$11n$ includes an m-bits data storing portion corresponding to the m interrupt levels $RQO_1$–$RQO_m$ of the CPU 12. A register table is provided wherein the relationships between the interrupt requests $RQI_1$–$RQI_n$ and the m interrupt levels $RQO_1$–$RQO_m$ of the CPU 12 are arranged. These relationships are previously stored in the registers $11a$–$11n$, for example, two specific input-output units having the same relationship or element, are stored as "1" at the same bit portions in the registers corresponding thereto (for example, registers 11a and 11b). Then, in the interrupt controller 10, when an interrupt request, for example, an interrupt request signal $RQI_1$, is output from the corresponding input-output unit 10a, the interrupt controller 10 refers to the register table of the register 11a and an interrupt level (interrupt level signal) $RQO_1$ is selected by referring to the bit portions storing "1", and the selected interrupt level signal $RQO_1$ is output to the CPU 12. The CPU 12 starts a processing function in response to the interrupt level signal $RQO_1$, and as a result, a data transfer, etc., can be carried out between the CPU 12 and the specific input-output unit 10a which has output the interrupt request $RQI_1$.

Figure 2:
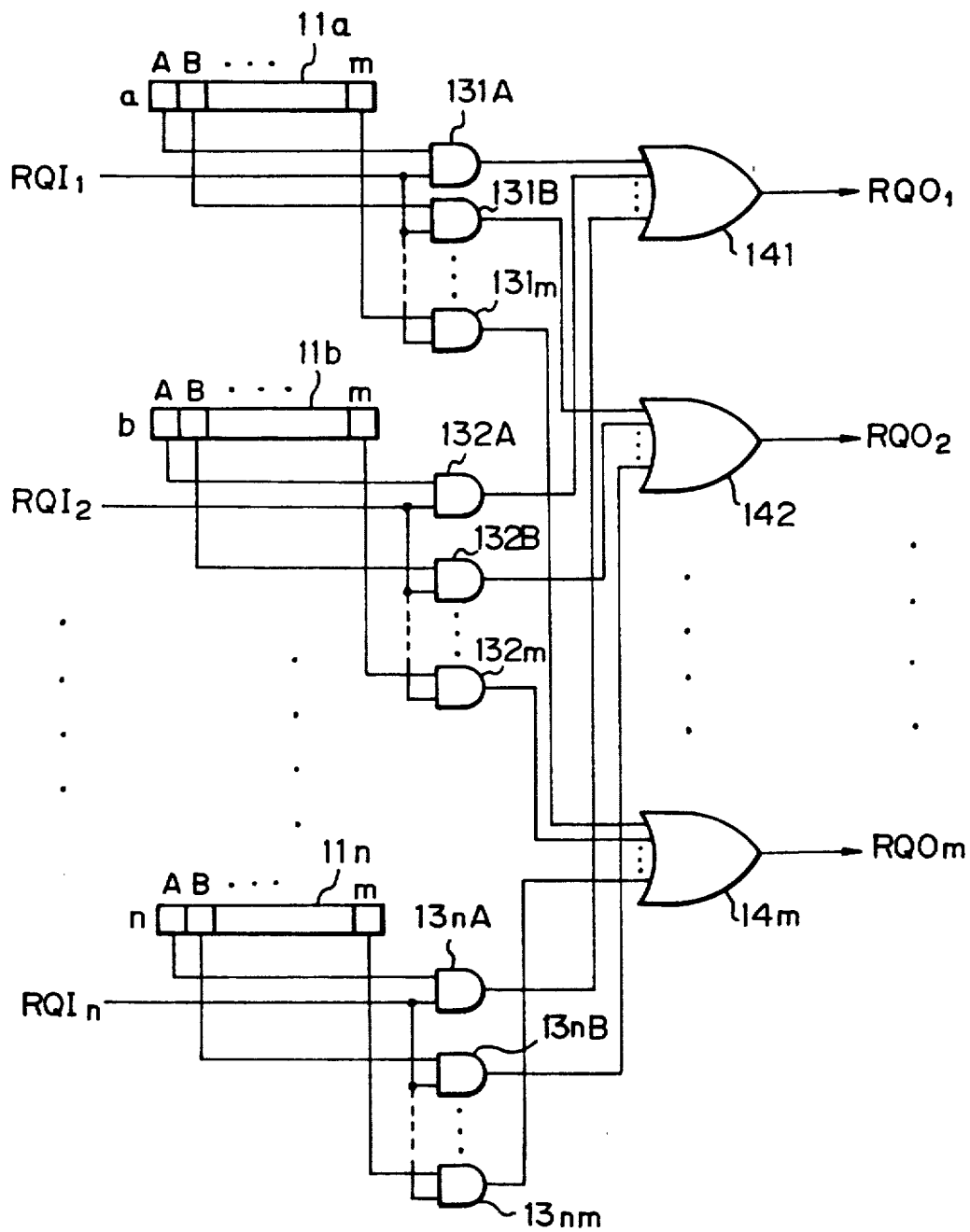
FIG. 2 is a circuit diagram of the grouping device shown in FIG. 1.

FIG. 2 is a circuit diagram of a grouping device shown in FIG. 1. As shown in FIGS. 1 and 2, in the conventional grouping device or the conventional interrupt controller, the total number n of the registers 11a-11n is the same as that of the input-output units 10a-10n; i.e., the register 11a is provided for the interrupt request $RQI_1$ output from the input-output unit 10a, the register 11b is provided for the interrupt request $RQI_2$ output from the input-output unit 10b, ..., and the register 11n is provided for the interrupt request $RQI_n$ output from the input-output unit 10n. Each register 11a-11n includes an m-bits data storing portion corresponding to the interrupt levels $RQO_1$-$RQO_m$ of the CPU 12.

The interrupt request signal $RQI_1$ is applied to one input of each AND-gate 131A-131m, and the other input of each AND-gate 131A-131m is supplied with the contents of the corresponding bit of the m-bits data storing portion in the register 11a. Similarly, the interrupt request signal $RQI_2$ is applied to one input of each AND-gate 132A-132m, and the other input of each AND-gate 132A-132m is supplied with the contents of the corresponding bit of the m-bits data storing portion in the register 11b. In this way, the interrupt request signal $RQI_n$ is applied to one input of each AND-gate 13nA-13nm, and the other input of the each AND-gate 13nA-13nm is supplied with the contents of the corresponding bit of the m-bits data storing portion in the register 11n. The output signal of each AND-gate is applied to m OR-gates 141-14m corresponding to the interrupt levels $RQO_1$-$RQO_m$ of the CPU 12; i.e., the output signals of the AND-gates 131A, 132A, ..., 13nA are applied to inputs of the OR-gate 141, the output signals of the AND-gates 131B, 132B, ..., 13nB are applied to inputs of the OR-gate 142, and the output signals of the AND-gates 131m, 132m, ..., 13nm are applied to inputs of the OR-gate 14m. The m OR-gates 141-141m output signals correspond to the interrupt levels $RQO_1$-$RQO_m$ to the CPU 12.

Note, the relationships, etc., between the interrupt requests $RQI_1$-$RQI_n$ or input-output units 10a-10n and the m interrupt levels $RQO_1$-$RQO_m$ are registered in the m-bits data storing portions of the registers 11a-11n, and the interrupt requests $RQI_1$-$RQI_n$ are grouped into the interrupt levels $RQO_1$-$RQO_m$ of the CPU 12 by referring to the contents of the register table including the registers 11a-11n. Consequently, the interrupt processes are performed in accordance with the interrupt levels $RQO_1$-$RQO_m$ or the interrupt requests $RQI_1$-$RQI_n$ grouped into the interrupt levels $RQO_1$-$RQO_m$. Furthermore, when changing the construction of the input-output units, it is only necessary rewrite the register table, and thus the flexibility is greatly increased.

In the conventional grouping device or the conventional interrupt controller, however, one register must be provided for each input-output unit, and therefore, the time for accessing the registers becomes long, and the confirmation of the contents of the registers by the CPU is difficult, for the following reasons. Generally, the total number n of input-output units 10a-10n is greater than the total number m of interrupt levels $RQO_1$-$RQO_m$, i.e., the total number of interrupt requests $RQI_1$-$RQI_n$ is far greater than that of the interrupt levels $RQO_1$-$RQO_m$ of the CPU 12. Therefore when one register is provided for each input-output unit, the total number of the registers is very high, and as a result, a problem arises in that the access time of the register table becomes longer in accordance with the total number of registers. Furthermore, when confirming the relationships, etc., registered in the register table corresponding to the specific interrupt level, from the CPU 12 side, the CPU accesses the registered table n times by accessing all of the registers, because corresponding bits of the specific interrupt level are distributed to one bit of each register. Namely, after checking a specific bit of one register, the same bit of the next register must be checked, and this checking action must be repeated. Consequently, in the conventional grouping device, another problem arises in that the confirmation from the CPU is unsatisfactory. This problem occurs even when the total number n is equal to the total number m.

An object of the present invention is to shorten the access time to the register and to improve the confirmation of the contents of the register by the CPU.

Next, the preferred embodiments of the present invention will be explained with reference to the drawings.

Figure 3:
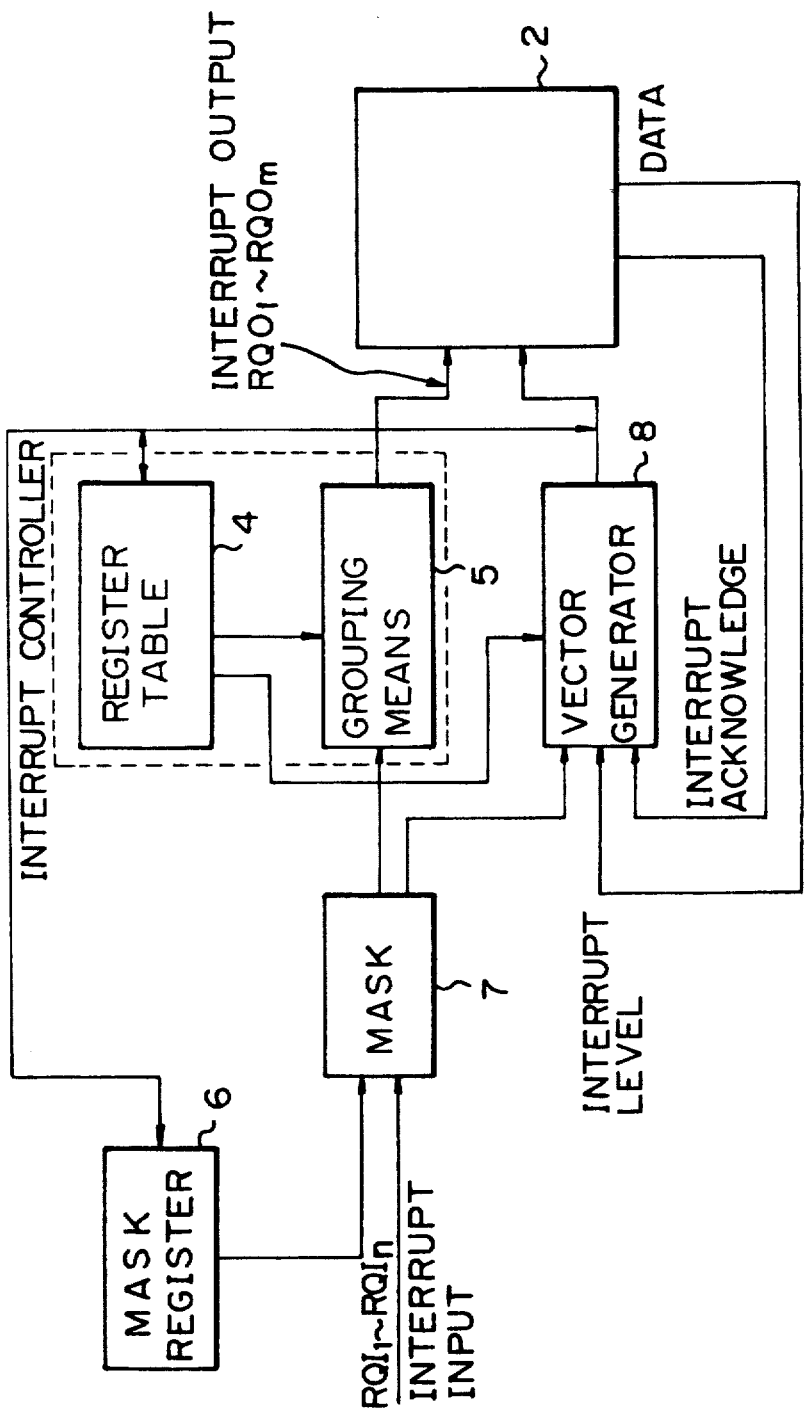
FIG. 3 is a block diagram of an interrupt controller having a grouping device according to the present invention.

FIG. 3 is a block diagram illustrating an interrupt controller having a grouping device according to the present invention. As shown in FIG. 3, an interrupt controller comprises a register table 4 corresponding to a level conversion register and a grouping means 5 corresponding to a level converter. Interrupt requests $RQI_1$-$RQI_n$ output from input-output units (not shown in the drawing) are supplied to the grouping means 5 through a mask 7. The interrupt requests $RQI_1$-$RQI_n$ are controlled by the CPU 2 to an interrupt enable state and an interrupt disable state, i.e., the interrupt requests $RQI_1$-$RQI_n$ are controlled to pass or not pass through the mask 7. Note, in the above maskable interrupt system, the interrupt requests $RQI_1$-$RQI_n$ are assigned to the interrupt levels $RQO_1$-$RQO_m$, which indicate the priority processing thereof; for example, when the CPU 2 is processing a high priority interrupt, i.e., a high level interrupt process, lower level interrupt requests are not allowed to pass through the mask 7 until the high level interrupt is completed. When the interrupt requests $RQI_1$-$RQI_n$ are applied to the grouping means 5 of the interrupt controller, reference is made to the register table 4 and a grouping process is performed. Then, one of the interrupt levels $RQO_1$-$RQO_m$ selected and grouped for the specific one of the input-output units outputting the interrupt requests $RQI_1$-$RQI_n$ is applied to the CPU 2, and the CPU 2 outputs an interrupt acknowledge signal and the interrupt level output from the interrupt controller to a vector generator 8. The vector generator 8 further receives an output signal indicating the specific input-output unit which has output the interrupt request, and the vector generator 8 outputs the specific vector value corresponding to the specific input-output unit, so that the CPU 2 obtains the head address of the specific interrupt processing routine and performs the specific processing program corresponding to the specific input-output unit which has output the specific interrupt request. In the above description, the content of the register table 4 is changed when signals output from the CPU 2 are received therein.

Figure 4:
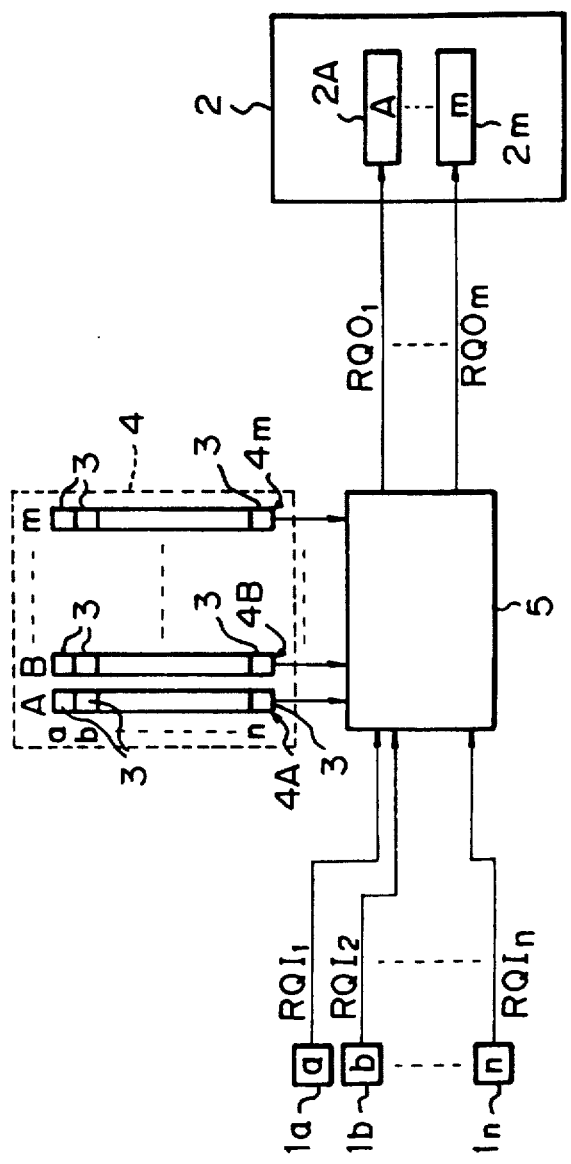
FIG. 4 is a basic block diagram of a grouping device according to the present invention.

FIG. 4 is a basic block diagram of a grouping device, i.e., an interrupt controller, according to the present invention.

As shown in FIG. 4, the interrupt controller groups n interrupt requests $RQI_1$-$RQI_n$ output from n input-output units $1a$-$1n$ into m interrupt levels $RQO_1$-$RQO_m$ of the CPU 2. The grouping device comprises a register table 4 for registering the relationships between the n interrupt requests $RQI_1$-$RQI_n$ and the m interrupt levels $RQO_1$-$RQO_m$ of the CPU 2, and a grouping means 5. The register table 4 has m registers $4A$-$4m$ corresponding to the m interrupt levels $RQO_1$-$RQO_m$, and each register includes an n-bits data storing portion 3 corresponding to the n interrupt requests $RQI_1$-$RQI_n$. The grouping means 5 receives grouping signals $G_1$-$G_m$ output from the register table 4, and the n interrupt requests $RQI_1$-$RQI_n$, selects one interrupt level from the m interrupt levels $RQO_1$-$RQO_m$ of the CPU 2 for each interrupt request $RQI_1$-$RQI_n$, and groups each interrupt request $RQI_1$-$RQI_n$ into the selected interrupt level in accordance with the register table 4.

Below, one example of a grouping device according to the present invention will be explained with reference to the drawings.

Figure 5:
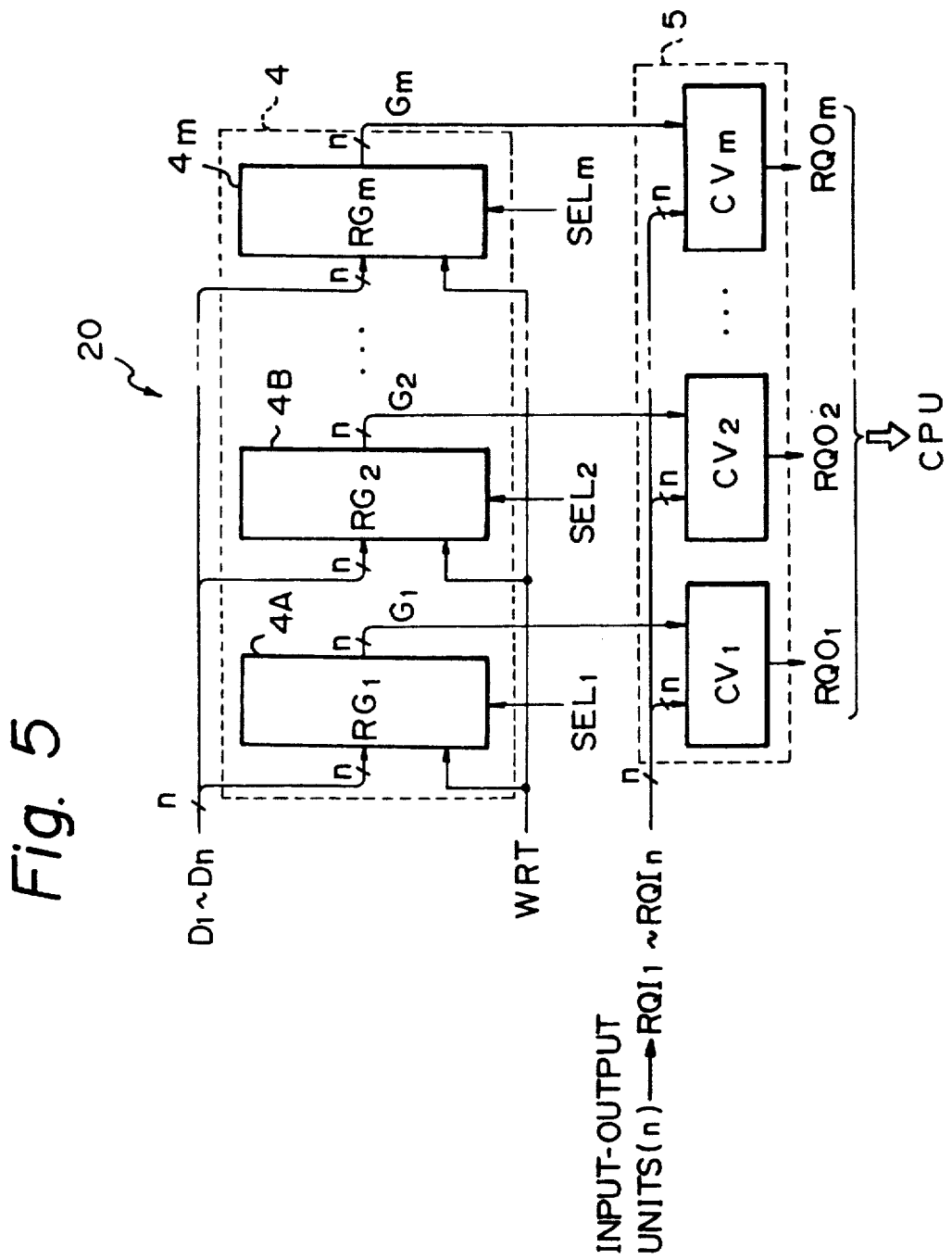
FIG. 5 is a block diagram of one example of a grouping device according to the present invention.

FIG. 5 is a block diagram illustrating one example of a grouping device, i.e., an interrupt controller, according to the present invention. The exemplified interrupt controller lies between n input-output units $1a$-$1n$ and a CPU 2, and groups n interrupt requests (interrupt request signals) $RQI_1$-$RQI_n$ output from n input-output units $1a$-$1n$ into m interrupt levels $RQO_1$-$RQO_m$ of the CPU 2. Note, generally the total number n of input-output units $1a$-$1n$ is greater than the total number m of interrupt levels $RQO_1$-$RQO_m$ of the CPU 2, but the total number n may be equal to the total number m.

First, the construction of the present embodiment will be explained. Reference numeral 20 denotes a grouping device which comprises a register table 4 including m registers $RG_1$-$RG_m$ and a grouping means including m converters $CV_1$-$CV_m$.

Registering data $D_1$-$D_n$ and a writing signal WRT are applied to each register $RG_1$-$RG_m$ as required, and further, selecting signals $SEL_1$-$SEL_m$ output from the CPU 2 are applied to the registers $RG_1$-$RG_m$. Further, the interrupt request signals $RQI_1$-$RQI_n$ output from the input-output units $1a$-$1n$ are applied to each converter circuit $CV_1$-$CV_m$, and grouping signals $G_1$-$G_m$ (described later in detail) output from the registers $RG_1$-$RG_m$ are applied to the corresponding converter circuits $CV_1$-$CV_m$.

Figure 6:
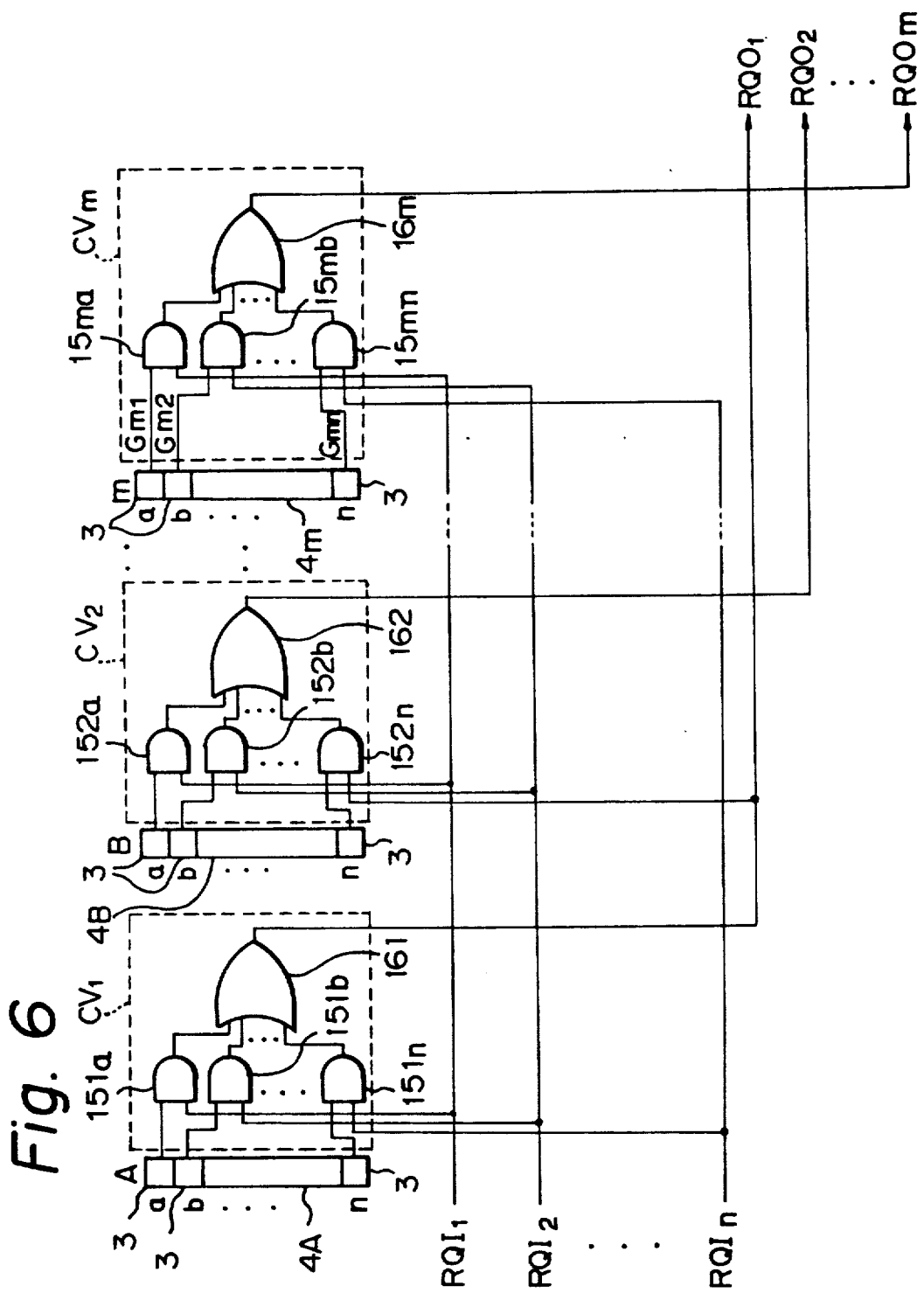
FIG. 6 is a circuit diagram of the grouping device shown in FIG. 5.

FIG. 6 is a circuit diagram of a grouping device (interrupt controller) shown in FIG. 5. As shown in FIG. 6, in the interrupt controller, the total number m of the registers $4A$-$4m$ is the same as that of the interrupt levels $RQO_1$-$RQO_m$ of the CPU 2; i.e., the register 4A is provided for the interrupt level $RQO_1$ of the CPU 2, the register 4B is provided for the interrupt level $RQO_2$ of the CPU 2, and the register $4m$ is provided for the interrupt level $RQO_m$ of the CPU 2. Each register $4A$-$4m$ includes an n-bits data storing portion 3 corresponding to the interrupt requests $RQI_1$-$RQI_n$ or the input-output units $1a$-$1n$, respectively.

The interrupt request $RQI_1$ is applied to each input of the AND-gates $151a$, $152a$, ..., $15ma$, the interrupt request $RQI_2$ is applied to each input of the AND-gates $151b$, $152b$, ..., $15mb$, and the interrupt request $RQI_n$ is applied to each input of the AND-gates $151n$, $152n$, ..., $15mn$, respectively. The other inputs of the AND-gates $151a$, $151b$, ..., $151n$ are supplied with the contents of the corresponding bit of the n-bits data storing portion in the register 4A, the other inputs of the AND-gates $152a$, $152b$, ..., $152n$ are supplied with the contents of the corresponding bit of the n-bits data storing portion in the register 4B, ..., and the other inputs of the AND-gates $15ma$, $15mb$, ..., $15mn$ are supplied with the contents of the corresponding bit of the n-bits data storing portion in the register $4m$. The output signals of the AND-gates $151a$, $151b$, ..., $151n$ are applied to an OR-gate 161, the output signals of the AND-gates $152a$, $152b$, ..., $152n$ are applied to an OR-gate 162, and the output signals of the AND-gates $15ma$, $15mb$, ..., $15mn$ are applied to an OR-gate $16m$. The output signals of the OR-gates $161$-$16m$ are output to the CPU 2 as the interrupt levels $RQO_1$-$RQO_m$ of the CPU 2.

Note, the relationships, etc., between the interrupt requests $RQI_1$-$RQI_n$ or input-output units $1a$-$1n$ and the m interrupt levels $RQO_1$-$RQO_m$ are registered in the n-bits data storing portion 3 of the registers $4A$-$4m$, and the interrupt requests $RQI_1$-$RQI_n$ are grouped into the interrupt levels $RQO_1$-$RQO_m$ of the CPU 2 by referring to the contents of the register table 4 including the registers $4A$-$4m$. Consequently, the interrupt processes are performed in accordance with the interrupt levels $RQO_1$-$RQO_m$ or the grouping of the interrupt requests $RQI_1$-$RQI_n$ into the interrupt levels $RQO_1$-$RQO_m$. Furthermore, when changing the construction of the input-output units, it is only necessary to rewrite the register table, and thus the flexibility is greatly increased.

Figure 7:
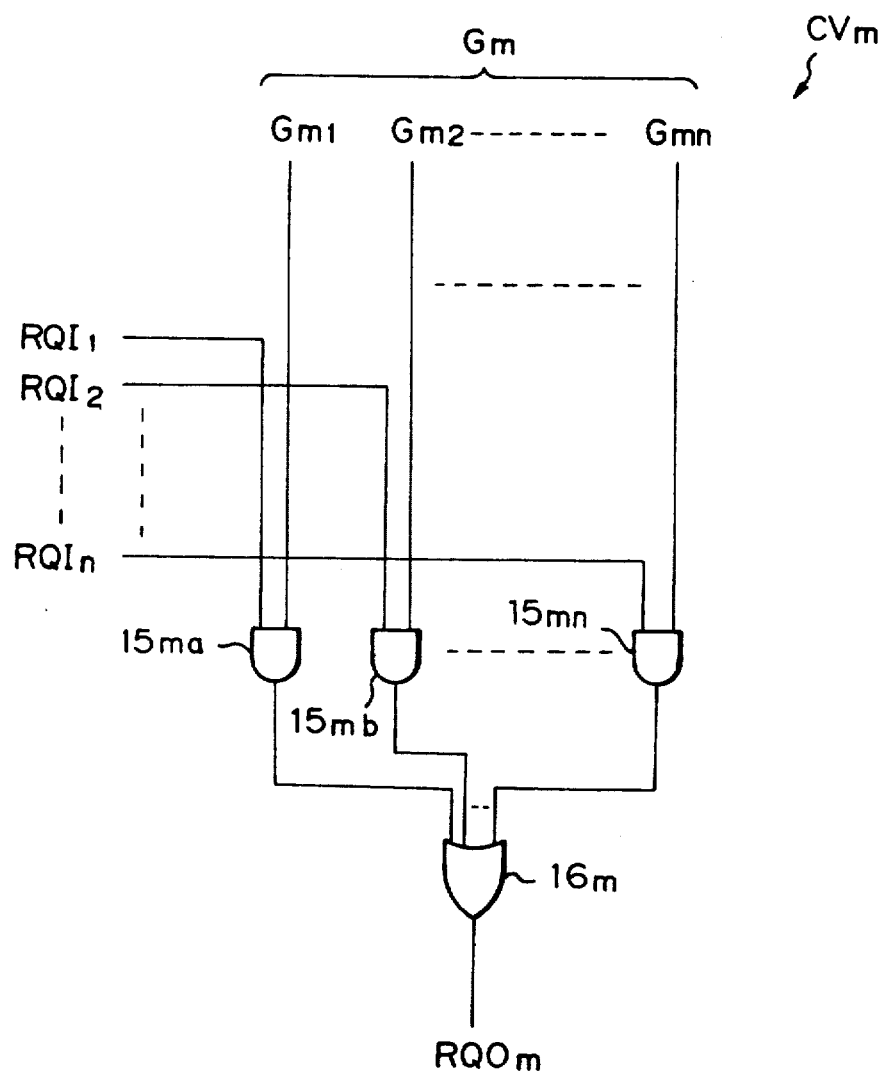
FIG. 7 is a circuit diagram of one example of the converter circuit shown in FIG. 5.

FIG. 7 is a circuit diagram of one example of a converter circuit $CV_m$ in the converter circuit $CV_1$-$CV_m$ shown in FIG. 5. The converter circuit $CV_m$ comprises one n-input OR-gate $16m$ and a total number n of AND-gates $15ma$-$15mn$ corresponding to the total number of input-output units $1a$-$1n$, operates the signals $RQI_1$ and $Gm_1$, $RQI_2$ and $Gm_2$, ..., $RQI_n$ and $Gm_n$, and outputs a logical sum of the operated signals as the interrupt level $RQO_m$. For example, when the interrupt request signal $RQI_1$ of the specific input-output unit $1a$ is output as "1", and the relationship of the input-output unit $1a$ corresponding to the signal $Gm_1$ of the grouping signal Gm which is stored in the register RGm is registered as $Gm_1$="1", the interrupt level value $RQO_m$ is set as $RQO_m$="1" and output to the CPU 2 (not shown in the drawing). The CPU 2 receives the interrupt level $RQO_m$="1" and activates the necessary interrupt processing program, so that the data transfer, etc., for the input-output unit $1a$ which has output the interrupt request $RQI_1$, is performed.

Figure 8:
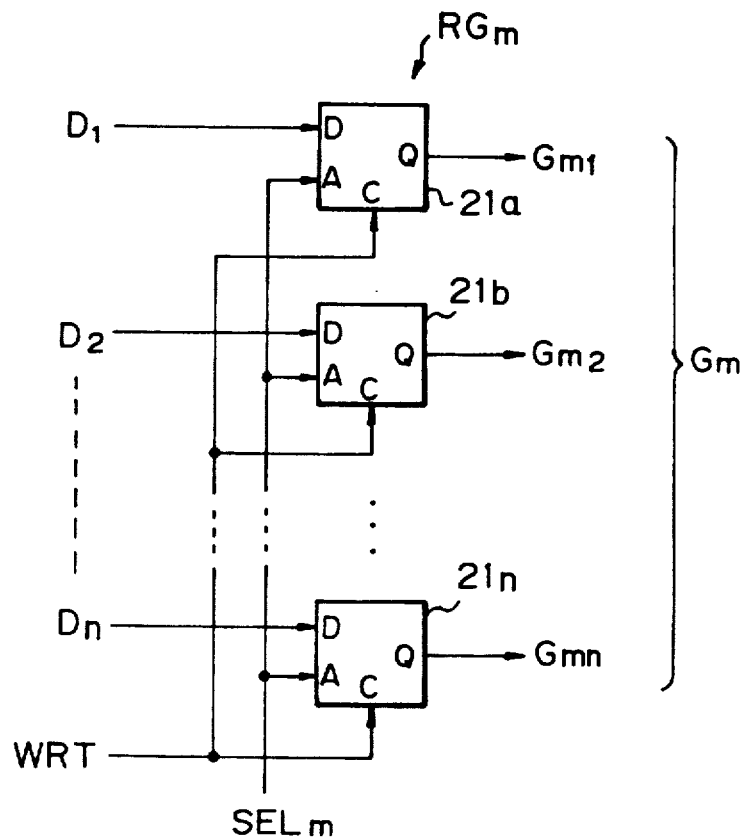
FIG. 8 is a circuit diagram of one example of the register circuit shown in FIG. 5; and, FIG. 9 is a circuit diagram of another example of the register circuit shown in FIG. 8.

FIG. 8 is a circuit diagram of the register RGm shown in FIG. 5. The register RGm includes n register circuits (data storing portions 3) $21a$-$21n$ corresponding to the total number n of the input-output units $1a$-$1n$ (not shown in the drawing). One bit of the registering data $D_1$-$D_n$ is applied to each D-terminal of the register circuits $21a$-$21n$, the writing signal WRT is applied to C-terminals of the register circuits $21a$-$21n$, and the selecting signal SELm (in the case of the register RGm, the selecting signal $SEL_1$ in the register $RG_1$) is applied to an A-terminal of the register RGm.

As described above, when one bit of the registering data $D_1-D_n$ is applied to the register circuit 21a as "1", when the selecting signal $SEL_m$ and the writing signal WRT are applied to the register circuits 21a as "1", then the data "1" is input to an internal part of the register circuit 21a and maintained therein. Conversely, when one bit of the registering data $D_1-D_n$ is applied to the register circuit 21a as "0", the previous data is maintained as it is. When both one bit of the registering data $D_1-D_n$ and the selecting signal SELm are applied to the register circuit 21a as "0", the previous data is also maintained. Further, when one bit of the registering data $D_1-D_n$ is applied to the register circuits 21a as "1" and the selecting signal SELm is applied to the register circuits 21a as "0", the maintained data is reset to "0".

The truth table of the above is shown in Table 1.

TABLE 1

|  | WRT C-TERMINAL | $D_1-D_n$ D-TERMINAL | $SEL_1-SEL_m$ A-TERMINAL | $Gm_1-Gm_n$ Q-TERMINAL | STATE |
|---|---|---|---|---|---|
| (I) |  | "0" | "0" | "1" OR "0" | MAINTAIN PREVIOUS VALUE |
| (II) | "1" | "0" | "1" | "1" OR "0" | MAINTAIN PREVIOUS VALUE |
| (III) |  | "1" | "0" | "0" | ERASE |
| (IV) |  | "1" | "1" | "1" | REGISTER |
| (V) | "0" | x | x | "1" OR "0" | MAINTAIN PREVIOUS VALUE |

Condition: x: DON'T CARE

Namely, in cases (I), (II), and (V), the previous maintained data "1" or "0" is output from Q-terminals of the register circuits as the request signals $Gm_1-Gm_n$. In case (III), the previous maintained data is reset and erased, and in case (IV), the data "1" is registered. As described above, the register table 4 is used for outputting the grouping signals $G_1-G_m$ from the registers $RG_1-RG_m$ to the converter circuits $CV_1-CV_m$. For example, the grouping signal Gm comprises n-bits $Gm_1-GM_n$ corresponding to the total number n of the input-output units.

Figure 9:
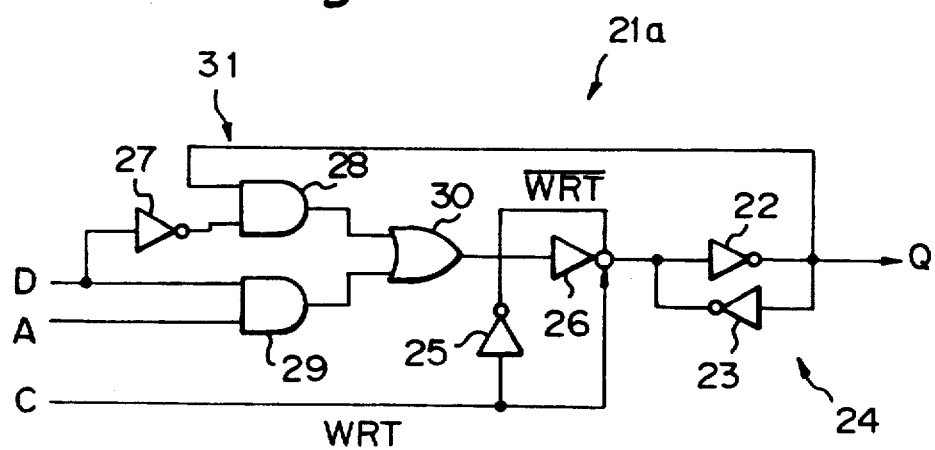

FIG. 9 is a circuit diagram of one example of the register circuits 21a-21n, which realizes the contents of the above Table 1 showing the truth table. The register circuit 21a will be described as an example.

The register circuit 21a comprises a latch circuit 24, an inverter circuit 26, and a logic circuit 31. The latch circuit 24 includes an inverter 22 and a register-type inverter 23. These inverters 22 and 23 are cross-connected. The inverter 26 has a transmission gate for ON/OFF switching when receiving the writing signal WRT and an inverted writing signal $\overline{WRT}$ through an inverter 25, and an output of the inverter circuit 26 is connected commonly to the inverters 22, 23. The signal $\overline{WRT}$ is generated by the inverter 25, which receives the writing signal WRT applied to the C-terminal. The logic circuit 31 includes AND-gates 28, 29, an OR-gate 30, and an inverter 27 which holds the latch circuit 24 in a set state or a reset state through the inverter 26 having the transmission gate. The logic circuit 31 logically operates logic signals applied to the D-terminal, A-terminal, and Q-terminal.

Next, the operation of the above embodiment will be explained.

When the register table 4 including the registers $RG_1-RG_m$ is rewritten overall, the writing signal WRT is made "1" and the selecting signals $SEL_1-SEL_m$ are made "1", and the registered data $D_1-D_n$ is transferred to the grouping device 20 by m repetitions from the CPU. For example, the registered data $D_1-D_n$ transferred at the third repetition is received in the register $RG_m$ by the selecting signal $SEL_m$, so that the register circuits 21a-21n are set to "1" corresponding to the "1" bits of the registered data $D_1-D_n$.

Next, a more concrete explanation will be given. First, the datum $D_1$ is at "1", and the other data $D_2-D_n$ is at "0", the register circuit 21a is set to "1" and the other register circuits 21b-21n are maintained at previous values. Consequently, the grouping signals $Gm_1-GM_n$ (which equal the grouping signal Gm) output from each Q-terminal of the register circuits 21a-21n are $Gm_1$="1", $Gm_2-Gm_n$="1" or "0" (which are the previous values).

As described above, when the registered data $D_1-D_n$ is transferred to the grouping device 20 by m repetitions from the CPU, the data transferred by the first repetition is stored in the register $RG_1$, the data transferred by the second repetition is stored in the register $RG_2$..., and the data transferred by the m-repetition is stored in the register $RG_m$, and thus the elements of the input-output units are registered in the register table.

In the above description, the process of registering the relationship of one input-output unit is one portion (specific one bit) in the register table 4, and a double registering is not accepted. Namely, when the registered data $D_1-D_n$ in the specific-repetition is input to the grouping device 20, the registered data $D_1-D_n$ is applied to all of the registers $RG_1-RG_m$, but the register in which in practice the data is registered, is one of the registers $RG_1-RG_m$ selected by the selecting signals $SEL_1-SEL_m$.

Namely, in the non-selected registers of the registers $RG_1-RG_m$, for example, the register $RG_m$ is not selected, the selecting signal $SEL_m$ applied to the register $RG_m$ is at "0", and therefore, in the register circuit where A="0", D="1", the stored content is erased to "0" and reset in accordance with the above mentioned truth table of Table 1. As a result, the specific bits of the selected registers $RG_1-RG_m$ are stored as "1" and the other specific bits of the non-selected registers $RG_1-RG_m$ are reset (the previous data is erased), and thus a double registering is avoided.

Next, the case where a part of the register table is rewritten by changing the relationships between the interrupt requests $RQI_1-RQI_n$ of the input-output units 1a-1n and the interrupt levels $RQO_1-RQO_m$ of the CPU 2, will be explained. In this case, in the present embodiment access is needed to only the register wherein a new relationship is registered, by avoiding the double registering as described above. For example, the process of changing the relationship registered in the register circuit 21a in the register $RG_1$ and that registered in the register circuit 21a in the register $RG_m$ is described below. Namely, the CPU outputs $D_1=$"1", $D_2-D_n=$"0", and raises the signal $SEL_m$ to "1". Therefore, the value "1" set to the register circuit 21a in the register $RG_m$ and the value "1" set to the register circuit 21a in the register $RG_1$ is erased. As a result, only by accessing the new destination of the register $RG_m$, the previous relationship of the input-output unit stored in the register $RG_1$ can be erased, and at the same time, the new relationship of the input-output unit can be stored in the register $RG_m$. Therefore, the register access time can be shortened.

On the other hand, when an interrupt request $RQI_1$-$RQI_n$ is output from the input-output unit $1a$-$1n$, for example, the interrupt request signal $RQI_1$ is output from the specific input-output unit $1a$ as the value "1", one of the interrupt levels of the CPU 2 is selected and the interrupt request signal $RQI_1$ grouped into the selected interrupt level by the grouping device 20 in accordance with all of the interrupt requests including the interrupt request $RQI_1$, and the register table 4.

A more detailed explanation of the above will be given. The interrupt request signals $RQI_1$-$RQI_n$ are applied to all of the converter circuits $CV_1$-$CV_m$, the number of which is the same as the total number of the interrupt levels $RQO_1$-$RQO_m$. In each of the converter circuits $CV_1$-$CV_m$, conjunctions are produced between the processing request signals $RQI_1$-$RQI_n$ and the contents of the register table 4 including the registers $RG_1$-$RG_m$, by the converter circuits $CV_1$-$CV_m$. The register table supplied to the converter circuits $CV_1$-$CV_m$ $CV_m$ is compared to one group of the m groups ($G_1$-$G_m$), and this group is taken as corresponding to one interrupt level. Therefore, in each of the converter circuits $CV_1$-$CV_m$, both the register table 4 corresponding to the relationships and the interrupt request signals $RQI_1$-$RQI_n$ are processed to produce the conjunctions. For example, when the relationship ("1") is registered in the register circuit 21a of the register $RG_m$, both the register table 4 corresponding to the relationship output from the register $RG_m$ and the interrupt request signals $RQI_1$-$RQI_n$ are processed to produce the conjunction. If the interrupt request signal $RQI_1$ is at "1", the interrupt level and the registered relationship are identical, and thus the interrupt level $RQO_m$ is output to the CPU 2 to activate a specific processing function corresponding to the interrupt request $RQI_1$. The CPU 2 activates the specific processing function, and for example, performs the transfer with the input-output unit $1a$ which has output the processing request signal $RQI_1$, to the CPU 2.

In the present embodiment described above, the registers are provided for each interrupt level $RQO_1$-$RQO_m$ of the CPU 2, and generally the total number m of the interrupt levels $RQO_1$-$RQO_m$ is smaller than the total number n of the interrupt requests $RQI_1$-$RQI_n$ of the input-output units $1a$-$1n$, and thus the number n minus m of the registers can be omitted from the interrupt controller. This advantage is particularly noticeable when the sum of n minus m is larger. During a register access, the time required for access can be shortened, since the register access can be performed by only accessing the register destination register. Further, double registering is avoided, since the previous data registered in the same bit of the other registers is erased at the same time as the access is carried out.

Furthermore, when confirming the present state of the registered relationship corresponding to the specific interrupt level from the CPU side, only the output signal of the register corresponding to the specific interrupt level need be checked, and thus the confirmation of the content of the register table by the CPU is made easier.

Many different embodiments of the present invention may be constructed without departing from the spirit and scope of the present invention, and it should be understood that the present invention is not limited to the specific embodiments described in this specification, except as defined in the appended claims.

We claim:

1. A grouping device for forming n input signals into m groups, wherein both n and m are greater than zero, comprising:

a register table having m registers corresponding to m groups, each register including an n-bits data storing portion, each bit of said data storing portion corresponding to one of said n input signals, wherein when data is stored in said data storing portion each bit of said data stored in said data storing portion designates an assignment of one of said n-input signals to one of said m groups;

a grouping means receiving said n input signals and grouping signals output from each of said registers in said register table, each of said grouping signals indicating whether said data designating an assignment is presently stored in said data storing portion of the register, wherein said grouping means comprises m converter circuits, each of said converter circuits receiving said n input signals and n grouping signals output from one of said m registers, said grouping means selecting one group from said m groups for each input signal and grouping said each input signal into said selected group depending on which of said m-registers data corresponding to said each input signal is stored in.

2. A grouping device as claimed in claim 1, wherein n is equal to m.

3. A grouping device as claimed in claim 1, further comprising a CPU and means for supplying register data, a writing signal and a selecting signal output from said CPU to said registers, wherein the contents of said each register are changed when said register data, said writing signal and said selecting signal output from said CPU are received thereby.

4. A grouping device as claimed in claim 1, further comprising a CPU and means for supplying register data, a writing signal and a selecting signal output from said CPU to said registers, wherein said each register comprises n register circuits, and said each register circuit receives said register data, said writing signal and said selecting signal from said CPU and outputs a grouping signal.

5. A grouping device as claimed in claim 4, wherein said each register circuit comprises: a latch circuit including a first inverter and a register-type inverter cross-connected therebetween; an inverter circuit having a transmission gate for ON/OFF switching when receiving said writing signal and an inverted writing signal through a second inverter, an output of said inverter circuit being connected to an input of said latch circuit; and a logic circuit, including a third inverter, first and second AND-gates, and an OR-gate, an input of said third inverter being supplied with register data and an output of said third inverter being connected to an input of said first AND-gate, another input of said first AND-gate being connected to an output of said latch circuit, inputs of said second AND-gates being supplied with said register data and said selecting signal, and outputs of said first and second AND-gates being applied to inputs of said OR-gate.

6. A grouping device as claimed in claim 1, wherein said each converter circuit comprises one n-inputs OR-gate and n AND-gates corresponding to a total number of said input signals, the n inputs of said each OR-gate being supplied with output signals of said n AND-gates, respectively.

7. An interrupt controller for grouping n interrupt requests output from n input-output units into m interrupt levels of a CPU, wherein both n and m are greater than zero, comprising:
- a register table having m registers corresponding to said m interrupt levels, each register including an n-bits data storing portion, each bit of said data storing portion corresponding to one of said n interrupt requests, wherein when data is stored in said data storing portion each bit of said data stored in said data storing portion designates an assignment of one of said n interrupt request to one of said m interrupt levels of said CPU; and
- a grouping means receiving said n interrupt requests and grouping signals output from each of said registers in said register table, each of said grouping signals indicating whether said data designating said assignment is presently stored in said data storing portion of the register, wherein said grouping means comprises m converter circuits, each of said converter circuits receiving said n interrupt requests output from said n input-output units and n grouping signals output from said each register, said grouping means selecting one interrupt level from said m interrupt levels of said CPU for each interrupt request and grouping said each interrupt request into said selected interrupt level depending on which of said m-registers data corresponding to said each interrupt request is stored in.

8. An interrupt controller as claimed in claim 7, wherein n is equal to m.

9. An interrupt controller as claimed in claim 7, further comprising means for supplying register data, a writing signal and a selecting signal output from said CPU to said registers, wherein the contents of said each register are changed when said register data, said writing signal and said selecting signal output from said CPU are received thereby.

10. An interrupt controller as claimed in claim 7, further comprising means for supplying register data, a writing signal and a selecting signal output from said CPU to said registers, wherein said each register comprises n register circuits, and said each register circuit receives said register data, said writing signal and said selecting signal from said CPU and outputs a grouping signal.

11. An interrupt controller as claimed in claim 10, wherein said each register circuit comprises: a latch circuit including a first inverter and a register-type inverter cross-connected therebetween; an inverter circuit having a transmission gate for ON/OFF switching when receiving said writing signal and an inverted writing signal through a second inverter, an output of said inverter circuit being connected to an input of said latch circuit; and a logic circuit including a third inverter, first and second AND-gates, and an OR-gate, an input of said third inverter being supplied with register data and an output of said third inverter being connected to an input of said first AND-gate, another input of said first AND-gate being connected to an output of said latch circuit, inputs of said second AND-gates being supplied with said register data and said selecting signal, and outputs of said first and second AND-gates being applied to inputs of said OR-gate.

12. An interrupt controller as claimed in claim 7, wherein said each converter circuit comprises one n-inputs OR-gate and n AND-gates corresponding to a total number of said interrupt requests, the n-inputs of said each OR-gate being supplied with output signals of said n AND-gates.

* * * * *